April 16, 1940.    C. B. NELSON    2,197,056
ELECTRICAL COOKING APPLIANCE
Filed Sept. 22, 1938    2 Sheets-Sheet 1

INVENTOR.
Christ B. Nelson
BY
ATTORNEY.

April 16, 1940.   C. B. NELSON   2,197,056
ELECTRICAL COOKING APPLIANCE
Filed Sept. 22, 1938   2 Sheets-Sheet 2
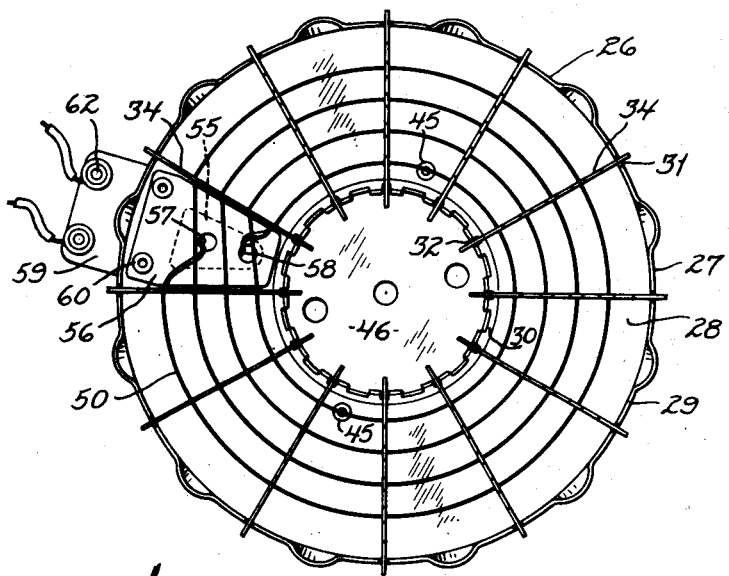
Fig. 3
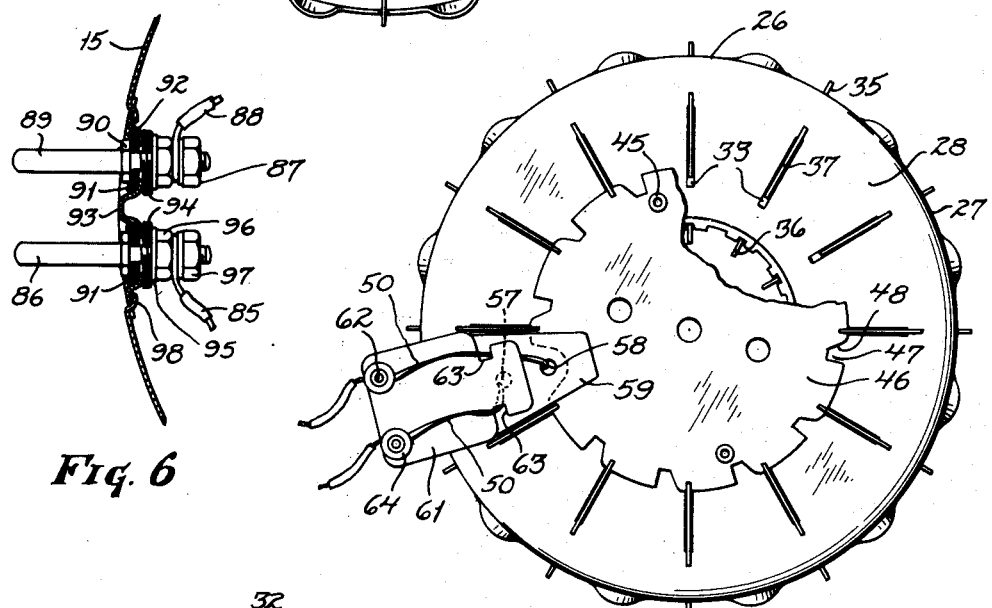
Fig. 6
Fig. 4
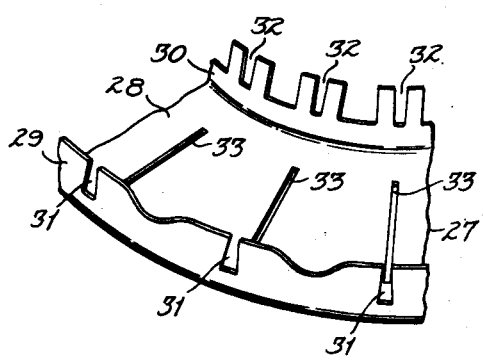
Fig. 7
INVENTOR.
Christ B. Nelson
BY
ATTORNEY.

Patented Apr. 16, 1940

2,197,056

UNITED STATES PATENT OFFICE 2,197,056

ELECTRICAL COOKING APPLIANCE

Christ B. Nelson, Cleveland, Ohio

Application September 22, 1938, Serial No. 231,184

5 Claims. (Cl. 219—19)

This invention relates to electrically heated cooking appliances, and more particularly to the improved arrangement of the heating means for such appliances.

Electrically heated cooking appliances, such as waffle irons and the like, have commonly used ribbon type resistance wire as a heating element but the wire has been disposed in the appliance so that the heating means could not be assembled or replaced as an independent unit. Additionally, the heating means in prior appliances of this type with which I am familiar, have not confined the heating area to an efficient zone but considerable heat energy is devoted to heating parts of the appliance or is radiated without contributing in any appreciable degree to heating the material to be cooked.

The aforementioned disadvantages result in a relatively expensive appliance not only from the standpoint of assembly and manufacture but in replacement of the heating unit and operating costs. I have provided an improved cooking appliance of this type wherein the heating means may be inserted or replaced as a unit and wherein the heating is largely confined to a desired area.

It is a primary object of my invention to provide an electrically heated cooking appliance having approved heating means associated therewith.

Another object of my invention is to provide an electrically heated cooking appliance wherein the heating means may be efficiently assembled as an independent unit and easily mounted in the appliance.

Another object of my invention is to provide electrically heated cooking appliances having improved heating means associated therewith and so disposed as to substantially confine the heating effect to an efficient zone.

Another object of my invention is to provide an improved method of mounting resistance wire in a heating unit for cooking appliances and the like.

Another object of my invention is to provide an electrically heated cooking appliance wherein the heating means may be easily replaced.

Other objects of my invention and the invention itself will become increasingly apparent from a consideration of the following description and drawings wherein:

Fig. 3 is a plan view of the lower heating unit of Fig. 2;

Fig. 4 is a plan view of the upper heating unit of Fig. 2;

Fig. 6 is an enlarged fragmentary sectional view of contacts which I may employ, and Fig. 7 is a fragmentary perspective view of the heating unit housing.

Figure 1:
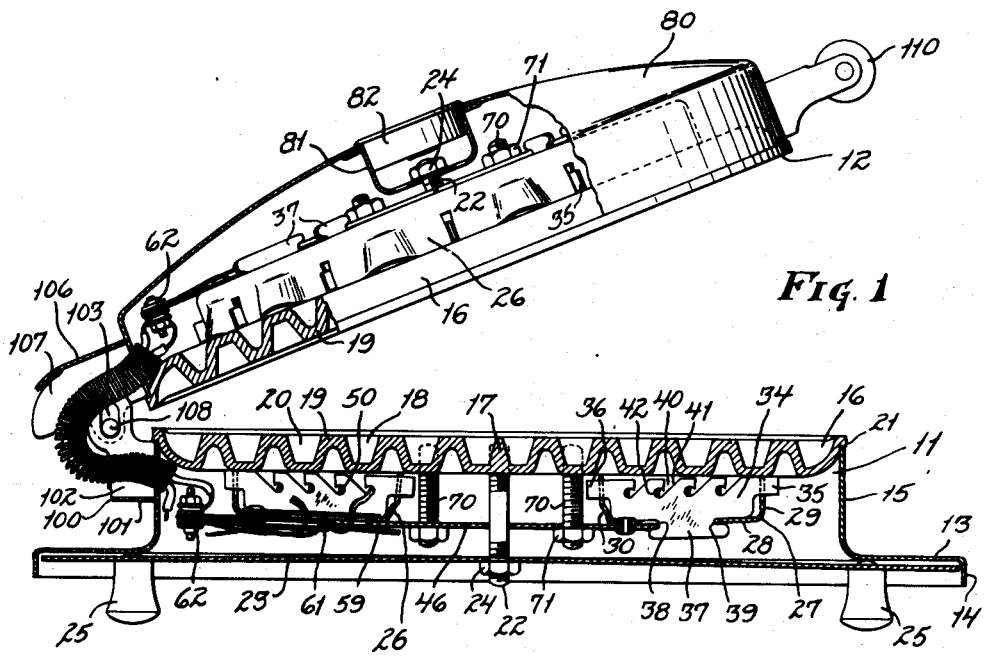
Fig. 1 is an elevational view mainly in section of a preferred form of my invention.

Referring now to the drawings, I have illustrated an electrically heated cooking appliance, particularly adapted to the making of waffles and comprising a base 11 and a cooperating cover generally indicated at 12. The base 11 comprises a sheet metal housing including a generally square lower portion 13 provided with a depending flange 14 and an upstanding cylindrical portion 15, the housing being preferably externally plated with suitable material, such as nickel or chromium. Supported on the housing cylindrical portion 15 is a generally circular waffle iron 16 provided with an upstanding rib 17 extending along a diameter and a similar rib 18 also extending along a diameter at right angles to rib 17, thereby dividing the iron into quadrants. Each quadrant is provided with a plurality of upstanding projections 19 having recesses 20 therebetween, adapted to receive similar projections 19 mounted on a cooperating upper similarly formed waffle iron 16. When the cover 12 is closed the projections 19 on each waffle iron 16 are maintained spaced from the cooperating recesses 20 so that the waffle material may flow therebetween in a well known manner. The specific form of the waffle iron constitutes no essential part of my invention and any desired form may be employed.

The waffle iron is provided with a peripheral flange 21 adapted to seat upon the upper end of cylindrical housing portion 15. The bottom plate of the base of the waffle iron 16 is provided with a centrally disposed threaded recess to receive a stud bolt 22, the lower end of the bolt 22 being adapted to project through a central perforation provided in the generally square plate 23 of the base 11, disposed within the lower portion 13 of the housing and secured by a nut 24 threadedly engaging the stud. Legs 25 are provided adjacent each corner of plate 23 for supporting the appliance.

A generally circular heating unit 26 is disposed beneath the lower waffle iron 16 and comprises a sheet metal housing element 27 including a base 28, a peripheral upstanding annular flange 29 and radially inner upstanding annular flange 30.

A relatively large central opening is thus formed in the base of element 27. The flanges 29 and 30 are slotted as indicated at 31 and 32 to provide a plurality of pairs of vertical slots in radial alignment. The base 28 of element 21 is also slotted as indicated at 33, each of the slots 33 being in radial alignment with a pair of slots 31 and 32. These slots 31, 32 and 33 cooperate to support insulating elements 34 formed of mica or the like. The insulating elements 34 each comprise an arm 35 adapted to be received in slot 31, an arm 36 adapted to be received in slot 32, and a depending arm 37 adapted to be projected through slot 33 in the base of element 27. The depending arm 37 is of a length slightly less than slot 33 so that it may be easily projected therethrough and is cut back adjacent each end, as indicated at 38 and 39, for a purpose to be described. The upper portion of element 34 is provided with a plurality of spaced notches 40, each notch having an inclined face 41 terminating in an arcuate undercut portion 42.

A circular plate 46 is provided with a plurality of notches 47, each of said notches having an inclined camming face 48 for a purpose to be described. The notches 47 are positioned so that when the plate 46 is rotated to dispose the notches 47 in alignment with the slots 33 in the base of element 27, the slots 33 will be entirely uncovered and as the plate is rotated out of alignment, the slots 33 will be partially covered.

The manner of quickly and easily mounting the insulating elements 34 in element 27 will now be described:

The plate 46 is rotated so that the slots 47 are in alignment with the slots 33 of element 27 and the insulating elements 34 are then disposed with arms 35 disposed in slot 31, arms 36 disposed in slots 32, and arms 37 projected through slots 33. Upon rotating the plate 46 in a clock-wise direction, as viewed in Fig. 4, the inclined or camming face 48 of the slot 47 will engage the cut-back portion 38 of element 34 and force the elements 34 radially outwardly and upon continued rotation of plate 46 to the position illustrated in Fig. 4, the un-notched peripheral portion of plate 46 will be seated within cut-back portions 38 of elements 34 and the cut-back portions 39 of elements 34 will engage the base of element 27, thereby concurrently locking all of the insulating elements 34 in position. The base 28 of element 27 is perforated preferably at two points and the plate 46 is similarly perforated, whereby upon plate 46 being rotated to the position illustrated in Fig. 4, the perforations will be aligned and eyelet form rivets 45 may interlock plate 46 with element 27.

Preferably ribbon type resistance wire 50 is then wound in spiral form and secured at spaced points within the notches 40 of insulating element 34, the shape of the notches 40 permitting the wire 50 to be easily located within the notches and as the wire is drawn taut, it will slide down the inclined faces 41 of the notches and seat within the arcuate under-cut portions 42. The aforementioned construction of the heating unit permits the insulating elements 34 and the resistance wire to be quickly and easily assembled to provide a compact unit.

A portion of base 28 of element 27 is provided with a generally triangular perforation 55, best illustrated in Fig. 3, disposed intermediate two adjacent insulating elements 34, and a generally triangular mica or the like insulating strip 56 is secured on the upper side of base 28 of element 27 and perforated whereby the ends of the resistance wire may be projected therethrough as indicated at 57 and 58. The opposite or bottom face of base 28 of element 27 has a second strip of insulating material 59, disposed thereagainst, the strips 56 and 59 being secured by rivets 60 projected through the strips and base 28, the rivets preferably being of eyelet form. Strip 59 has a generally square portion extending outwardly beyond the periphery of base 28 and a third strip of insulating material 61 is secured thereto by a pair of nut and bolt connections 62. The ends of the resistance wire 50 are looped through grooves 63 formed in insulating strip 61 with each end of the wire being secured to a different nut and bolt connection 62 thereby forming a terminal connection, the connection preferably being effected by providing a shoulder on the bolt and telescoping a washer 64 over the bolt and against the shoulder whereby the ends of wire 50 may be tightly clamped intermediate the washer 64 and strip 61.

Figure 2:
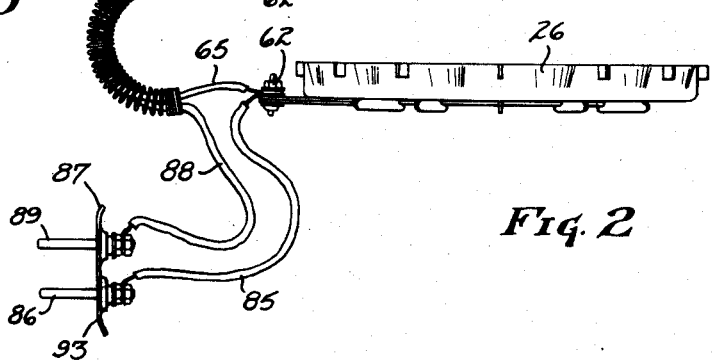
Fig. 2 is an elevational view, partially diagrammatic, of a pair of heating units which I may employ with the device of Fig. 1.

The heating units 26 are similar in construction and an insulated wire 65, as best illustrated in Fig. 2, connects one of the terminals 62 of the lower heating unit with a terminal 62 of the upper heating unit.

To secure the heating unit to the waffle iron, a stud 70 is threaded into the waffle iron base and projected through plate 46 of the heating unit and secured by a nut 71.

The cover 12 comprises a housing 80 generally of inverted cup form and preferably centrally perforated to receive a cup element 81 having the stud 22 projected through the base thereof and secured by nut 24. A thermally responsive indicating unit 82 may be mounted in the cup element 81 after assembly of the heating unit within the housing 80. The manner of connecting the heating unit to the power source will now be described:

One of the terminals 62, as best illustrated in Fig. 2, is connected by an insulated wire 85 to one prong 86 of a plug generally indicated at 87 whereby current may pass through prong 86 from the power source and by wire 85 to one terminal 62 of the lower heating unit and then through the resistance wire 50 and by wire 65 to the upper heating unit. After passing through wire 50 of the upper heating unit, the current passes by a wire 88 to a second prong 89 of the plug. The prongs 89 and 86 each comprise a pin threaded at one end and having an intermediate shoulder, preferably of hexagonal form as indicated at 90. The upstanding cylindrical portion 15 of the base housing 13 is provided with a generally rectangular perforation at a convenient point to receive a unit comprising mica or the like washers telescoped over prongs 86 and 89 and abutting the shoulders 90 formed thereon. Washers 91 are seated within dished portions 92 of a generally rectangular strip 93 perforated to receive prongs 86 and 89. A second pair of mica or the like washers 94 abut the inner face of strip 93 and the washers and prongs are secured by washers 95 and nuts 96 threadedly engaging the prongs. A second pair of washers and nuts 97 secure the ends of wires 85 and 88 to the prongs which, in the manner described, are insulated from the cylindrical wall 15.

The strip 93 and the assembled prongs are secured to the housing wall 15 by providing lateral notches in strip 93 and bending ears 98 to engage the notches. Thus the heating units can be assembled as illustrated in Fig. 2 and quickly mounted within the base and cover of the appliance.

Figure 5:
Fig. 5 is a fragmentary perspective view of the hinge connection illustrated in Fig. 1.

The manner of hingingly interconnecting the bottom or base 11 and cover 12 will now be described:

Referring to Figs. 1 and 5, a generally U-form bracket 100 comprises a horizontally extending web 101, and spaced upstanding leg 102, the bracket being secured to the cylindrical wall 15 by projecting lugs formed on the bracket legs 102 through perforations provided therefor in the wall 15 and bending over the lug to tightly clamp the bracket to the wall. The legs 102 are provided with elongated vertical extending slots 103. Secured in a similar manner to the lateral wall of the cover housing 80 is a second bracket of inverted U-form comprising a top 106 and integrally formed depending arms 107, the arms each having a pin 108 projected therethrough to engage the slots 103 and hingingly connect base 11 and cover 12. To limit opening movement of the cover 12, the legs 102 are preferably provided with laterally outwardly extending ears 109 adapted to engage the bottom edge of arms 107 after the top portion 12 has been opened to a substantially vertical position.

A suitable handle 110 preferably heat insulated, is provided for lifting the cover 12 and suitable handles may be provided for lifting the appliance bodily by clamping elements formed of heat insulating material to opposite edges of the lower portion 12 of the housing 13.

It will now be understood that I have provided heating units for the cover and base which may be quickly and easily assembled therewith and which confine the heating zone to the waffle iron in an efficient manner without unduly heating other parts of the appliance.

Although I have shown and described a preferred form of my invention, I contemplate that numerous and extensive departures may be made therefrom without departing from the spirit of my invention and the scope of the appended claims.

Having thus described my invention, what I claim is:

1. In an electrical cooking appliance, a heat retaining element adapted to receive material to be cooked, and a heating unit therefor, said unit comprising a housing secured to the heat retaining element, said housing comprising a base and a pair of upstanding flanges, said base being provided with slots aligned with slots provided in each of said flanges, a plurality of up-standing and radially disposed insulating strips adapted to be seated in each of said aligned slots in the housing, the portion of said strips which is projected through the slots base of said housing being of a length slightly less than the slot in the base of said housing and being cut back adjacent each end thereof, the cut back portion of said strips being adapted to have camming engagement with the slots provided in said base whereby upon rotation of the base the insulating strips will be forced radially outwardly to lock the same in position, a plurality of notches in the upper portion of each strip having an inclined face and an under-cut face portion, a flexible continuous heating element seated in the notches and retained by the undercut portion, means for connecting the heating element with a source of power.

2. In an electrical cooking appliance, a heat retaining element adapted to receive material to be cooked, and a heating unit therefor, said unit comprising a generally cup-form housing secured to the bottom of the heat retaining element, said housing comprising a base and a pair of upstanding flanges, said base being provided with slots aligned with slots provided in each of said flanges, a plurality of upstanding and radially disposed insulating strips in the housing, each strip having a portion seated in a slot provided in each of the housing flanges, and a notch portion projected through the aligned slot in the housing base, a movable element adapted to have camming engagement with the notch portion of each strip to retain the strip in the housing, a plurality of notches in the upper portion of each strip including an undercut portion, a flexible continuous heating element seated in the notches and retained therein by the undercut portions.

3. In an electrical cooking appliance, a heat retaining element adapted to receive material to be cooked, and a heating unit therefor, said unit comprising a generally cup-form housing secured to the bottom of the heat retaining element and having a continuous upstanding flange spaced inwardly upon the housing lateral walls, the housing lateral walls, flange, and base being perforated to provide a series of aligned slots, a plurality of upstanding insulated strips having one end portion seated in a slot in the wall and the opposite end portion seated in a slot in the flange, the bottom portion of the strip being loosely projected through the housing base, rotatable means engaging the bottom portion of each strip to lockingly retain the strips in position, a wire form heating element supported strips.

4. A heating unit, adapted to be secured to a grid or the like in an electrical cooking appliance, a unit comprising a cup-form housing having a radially inwardly annular flange, a plurality of pairs of slots, one in the flange and the other in the lateral wall of the housing in radial alignment, a plurality of slots in the housing base intermediate each pair of slots and in radial alignment therewith, a plurality of insulating strips, each strip having an end portion seated in a pair of slots and a depending portion projected through the slot in the housing base, the depending portion being notched at each end thereof, a movable locking element having a plurality of slots provided in its outer periphery, said slots each having a camming face, one of said notches receiving a portion of the housing base and the other notch in each of said strips receiving said camming face of said movable locking element and the upper portion of the strip being notched at spaced points, and a heating wire disposed in general spiral form seated within said upper portion notches.

5. A heating unit adapted to be secured to a grid or the like in an electrical cooking appliance, a unit comprising a cup-form housing having a radially inwardly annular flange, a plurality of pairs of slots, one in the flange and the other in the lateral wall of the housing in radial alignment, a plurality of slots in the housing base intermediate each pair of slots and in radial alignment therewith, a plurality of insulating strips, each strip having an end portion seated in a pair of slots and a depending portion projected through the slots in the housing base, the depending portion being notched at each end thereof, one of said notches receiving a portion of the housing base and the other notch receiving a movable locking element and the upper portion of the strip being notched at spaced points, a heating wire disposed in general spiral form seated within said upper portions notches, a circular plate having peripheral slots therein and a plate being adapted to be rotated between each of said slots in alignment with slots provided in the housing base whereby the depending portion of the strip may be projected through the base, and each of said slots in said locking element having an inclined camming face adapted to engage a strip and force the strip radially outwardly permitting an unnotched peripheral portion of the plate to seat within a notch in the strip.

CHRIST B. NELSON.